United States Patent [19]
Bates et al.

[11] Patent Number: 6,023,697
[45] Date of Patent: Feb. 8, 2000

[54] SYSTEMS AND METHODS FOR PROVIDING USER ASSISTANCE IN RETRIEVING DATA FROM A RELATIONAL DATABASE

[75] Inventors: Madeleine Bates, Marlborough; Robert J. Bobrow, Arlington; Sean C. Colbath, Boston; Thuy T. Pham, Norwood, all of Mass.

[73] Assignee: GTE Internetworking Incorporated, Burlington, Mass.

[21] Appl. No.: 09/028,821

[22] Filed: Feb. 24, 1998

Related U.S. Application Data

[60] Provisional application No. 60/038,965, Feb. 24, 1997.

[51] Int. Cl.[7] .................................................. G06F 17/30
[52] U.S. Cl. .......................... 707/4; 707/102; 345/336; 704/9; 704/276
[58] Field of Search ........................... 704/7, 9, 10, 270, 704/275, 235, 246, 251, 256, 257, 276, 4, 255; 707/10, 1–6, 102; 345/336, 347, 352

[56] References Cited

U.S. PATENT DOCUMENTS

| | | | |
|---|---|---|---|
| 5,386,556 | 1/1995 | Hedin et al. | 707/4 |
| 5,500,920 | 3/1996 | Kupiec | 704/270 |
| 5,671,404 | 9/1997 | Lizee et al. | 707/5 |
| 5,836,771 | 12/1996 | Ho et al. | 434/362 |
| 5,909,678 | 9/1996 | Bergman et al. | 707/4 |

OTHER PUBLICATIONS

"A New Restaurant Guide Conversational System: Issues in Rapid Prototyping for Specialized Domains" Seneff et al., Proceedings of the Fourth International Conference on Spoken Language, 1996 ICSLP 96, vol. 2, pp. 665–668, Oct. 1996.

John Makhoul and Richard Schwartz, State of the Art in Continuous Speech Recognition, Proc. Natl. Acad. Sci. USA, vol. 92, pp. 9956–9963, Oct. 1995.

Sanjiv k. Bhatia et al., Conceptual Query Formulation and Retrieval, Journal of Intelligent Information Systems, 5, 183–209 (1995).

*Primary Examiner*—Hosain T. Alam
*Attorney, Agent, or Firm*—Leonard Charles Suchyta

[57] ABSTRACT

A voice activated system for retrieving information from relation files in a database incorporating a "help" mechanism that leads the user to relevant information. The apparatus and method provides the user with a message that the spoken queries are understood or not. If understood the system outputs the desired information. If not understood the system asks for key words from the user. The system will respond with phrases using such key words that were built into the system vocabulary. The user may input the phrases into the recognition part of the apparatus or may voice new queries based on the phrase/sentences. The system responds with the desired information.

10 Claims, 4 Drawing Sheets

SYSTEMS AND METHODS FOR PROVIDING USER ASSISTANCE IN RETRIEVING DATA FROM A RELATIONAL DATABASE

Priority is claimed under 35 U.S.C. § 119 (e) for the present invention from a Provisional Application Ser. No. 60/038,765 filed on Feb. 24, 1997 of the same title and inventors as the present application.

GOVERNMENT CONTRACTS

The present invention was made with government support under Contract No. DABT63-94-C-0061 with ARPA. The government has certain rights in the invention.

ADDENDUMS

Four Addendums are attached to this application. Addendum 1 describes a preferred embodiment of a process for deriving meaning from words; Addendum #2 describes a preferred embodiment way of generating SQL rules; Addendum #3 describes a clause parsing tree used as part of a preferred grammar, and Addendum #4 describes a parsing tree for sentences also used in a preferred grammar.

FIELD OF INVENTION

This invention relates to the general field of retrieving information from related files within a relational database. More particularly, the present invention relates to helping the user retrieve information, from related files stored in a computer system or a network of computer systems, while staying within the vocabulary and semantic boundaries of the system.

BACKGROUND OF INVENTION

Computer applications that utilize a relational (related) database for storing and accessing information relevant to that application are known. The relational databases are typically designed such that information can be stored in one file that 'relates' to information stored in another file within the database structure. The database structure is used herein in a general sense where the databases may be comprised of files accessible over communication networks as well as locally. For example in such systems the database files may be those stored files accessible by any node on the network—the files need not be stored on the local memory of any particular hardware group. Information stored in related files permit rapid retrieval of more complex information than would otherwise be possible. Information stored in such a database provides a convenient method for users to retrieve information by typing in a query with knowledge of the underlying format. More often the user interfaces with a mouse-and-menu and completes a standard query without the user having any information on the underlying format.

A limitation of the mouse-and-menu method is that the user must point, click, drag, and type to excess to retrieve information from a database. For example, if a database contained logistical information in multiple files, it can be difficult and time consuming to access and sort through the multiple files looking for related information. In particular, if the user wanted to determine the supply level of a particular type of missile at a particular location being maintained by a particular military unit (an example of information retrieval from three sources) using the mouse-and-menu method, the user would need to search each of the three separate database files or tables, the first file containing the name of the missile; the second containing quantities of the missile at the various locations; and the third containing the military units responsible for maintenance at the locations.

More recently, spoken language recognition (voice activation) has been incorporated to make the searching easier to use, especially for complex databases. For example, the user no longer has to manually traverse multiple tables of an application database to find relevant information. The user could simply say, for example, "How many missiles are at the ammunition supply point for the air defense batteries?" However, a voice activated interface has a fixed vocabulary and a limited number of concepts (meaning); such a system does not have the full linguistic capabilities of a human. This limitation is broadened, with the incorporation of a large vocabulary recognition system into a voice activated application, where it is not obvious or intuitive to the user which queries an application may or may not accept, or where the system may not respond to in a meaningful fashion.

It is an object of the present invention to facilitate retrieving information from a relational database.

It is an object of the present invention to provide a user assistance or "help" function for assisting a user in staying within the vocabulary and semantics of a particular application system.

It is another object of the present invention to present sample clauses, phrases, and/or sentences to the user that relate to meaningful information within an application database.

Yet another object of the present invention is to accept lists of key words from a user and to provide automatically a set of clauses, phrases, and/or sentences related to key words within the vocabulary of the application.

SUMMARY OF THE INVENTION

The foregoing objects are met and limitations of the prior art overcome in a method and apparatus, having a lexicon and grammar, for retrieving data from files in a relational database. The invention incorporates a help system that responds to the user's inputs by helping keep the user's inquiries within the prescribed vocabulary and semantic boundaries of the system. In a preferred embodiment, the user may input verbal or spoken queries to the system.

In a preferred embodiment where the system accepts and digitizes spoken queries, the spoken words are digitized and input to a speech recognition module which determines the meaning of the digitized query. If the meaning can be ascertained, then the system provides information in accordance with that meaning, and if the meaning cannot be ascertained, then a message so indicating is output to the user. In response the user may input key words to the system. The system responds by outputting sample phrases incorporating those key words, wherein those phrases have been generated by the lexicon/grammar in the system.

The user may select among the phrases output those relevant phrases for further inquires or the user may formulate new queries based on the phrases (herein phrases is defined to include clauses and sentences) supplied by the apparatus and input these new phrases as queries into the apparatus, via voice or keyboard, for meaning determination. The system apparatus will then return information in accordance with the meaning provided by the apparatus. If a phrase does not lead to further information, that phrase is automatically dropped from the list of phrases.

In one aspect the apparatus and method of the present invention provides particular advantages when the vocabulary is comprised of thousands of words and/or when the words are technical in character.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
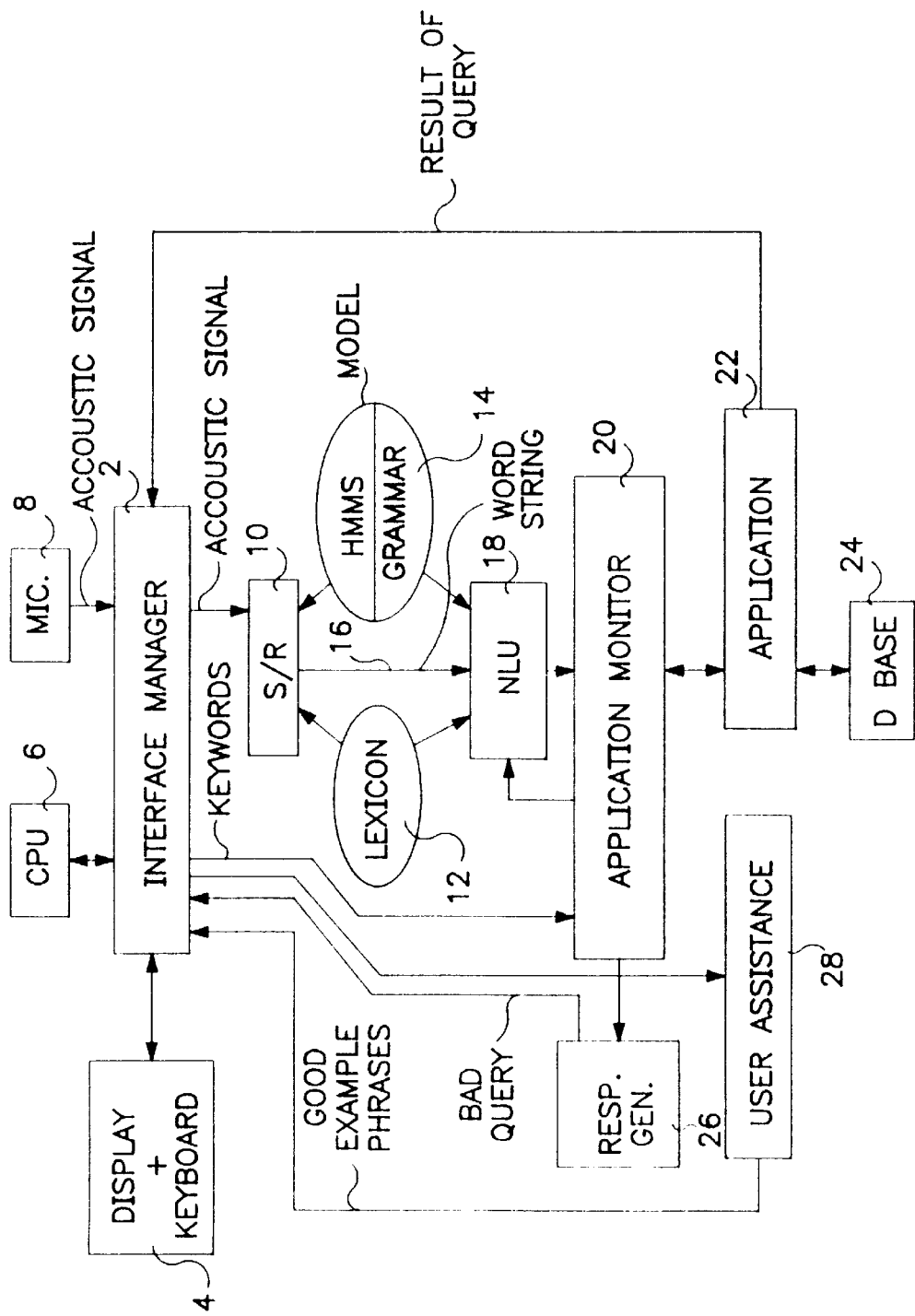
FIG. 1 is a functional block diagram of the overall system.

FIG. 1 shows, in part, an Interface Manager 2, with a display and keyboard 4, a CPU(a computer) 6 and a microphone 8. The microphone receives voiced (audio) signals which are sent to the Interface Manager. The analog audio signals are digitized, as known in the art, within the Interface Manager or the speech recognizer (S/R) 10. The Interface Manager contains software to prepare the S/R module for processing the digitized audio signals as is known in the art. The S/R module may be use the HARC software speech recognizer designed by Bolt Beranek and Newman (now GTE Internetworking, Inc).

The S/R module 10 utilizes information contained in a lexicon 12 and a language model, including a grammar, 14 and incorporating hidden Markov Models (HMM's) that have been previously trained as described in a paper by John Makhoul and Richard Schwartz entitled, "State of the Art in Continuous Speech Recognition" which is incorporated by reference herein. The output of the S/R is a string of words 16 that is input to a Natural Language Understanding (NLU) module 18. The process describing the workings of the NLU are described in the paper by Madeleine Bates et al. entitled, "The BBN/HARC Spoken Language Understanding System," Addendum 1 attached hereto. The NLU parses the word string resulting in a structure that represents meaning to the application. The meaning of the word string is passed to an Application Monitor 20 where it is translated into commands that the Application 20 can utilize to access relevant database information 24. The retrieved information from the database is passed to the Interface Manager for display 4. The grammars and the method of traversing these grammars to generate phrases utilized by the system to determine meaning of the input word strings is described below. If the NLU cannot parse the word string, the word string is meaningless to the application. A message is passed to the Response Generator 26 to notify the user, via the Interface Manager 2, that the system does not understand the user's input. Details of this foregoing operation are discussed below.

Still referring to FIG. 1, the NLU outputs the meaning of the word string to the Applications Monitor 20 for translation into a form that can be process by the database module. A standard database retrieval language is SQL. The NLU module output of meaning, in a preferred embodiment, is translated into SQL, which is used to interrogate the database 34. Rules for this translation are described in Addendum #2 attached hereto.

Still referring to FIG. 1, in the event that the user's query does not generate the desired response, the user can elect to invoke the User Assistance module 28 for help. When invoked, the user may enter selected key words that represent general topics (e.g. cities, supplies, cars, tanks, etc.) which when incorporated into a sentence would be understood by the system. The system responds with relevant information retrieved. The system responds to the key word input by either displaying a message that the word was not part of the lexicon 12, or displaying a listing of sample phrases that incorporate the key word(s) of interest and which phrases, when entered back into the system by the user, will generate some meaningful response. The user then reviews the list of displayed sample phrases/sentences to select those relevant to the information the user desires. The user may then ask a query based on the samples presented to the user. The user may input additional words wherein the system will generate meaningful phrases.

The operation of the NLU 18 and the grammar 14 are described with respect to a preferred embodiment of a grammar with parsing as described in Addendums #3 and #4 attached hereto. However, since there are a large number of alternatives for the expansion of most non-terminal symbols in the grammar, combined with a large number of optional expansions, resulting in large, complex grammar rules that are difficult to write, debug, and maintain, two layers of software have been added over the recursive transition networks (RTN's) described below. These software layers can be considered as higher level languages for generating grammars. The RTN's are produced through the compilation of simple inputs.

The first layer, called "S-rules", is a conventional context-free semantic grammar. S-rules look like RTN rules, but there can be more than one S-rule per non-terminal. A non-terminal appears on the left side of a rule and is changed into something else by the rule. This produces a less cluttered grammar, increases the convenience for the grammar developer, and produces a compact and efficient RTN. The second software layer, called Schema, are templates for producing S-rules which have variables that range over semantic classes and predicates which constrain the possible assignments. For example, a Schema dealing with prepositional phrases that can be post-modifiers of a known phrase is as follows:

```
(Schema pp-postmod-rule
    x/np/postmod
    ->
    y/z/pp          ;where
    (pp-relation?   x y z))
``` where the variables, x, y, and z are constrained by the requirement that z be a preposition which can link an object of semantic class x with an object of semantic class y. A large number of S-rules are automatically produced from this Schema, including the following, for example:

```
unit/np/postmod->supply/of-for/pp
unit/np/postmod->point-location/at/pp
unit/np/postmod->unit/under/pp
```

The relation facts about the prepositions and allowable subjects and objects are stored in a separate table, which the instantiation process consults to determine which assignments satisfy the predicate. While Schemas can help the grammar developer to avoid writing s-rules, they do not prevent them from writing S-rules directly if the developer so chooses. If a given phenomenon does not fit any of the domain-independent Schemas available, one can step down to the S-rules level and cover them directly.

Figure 2A:
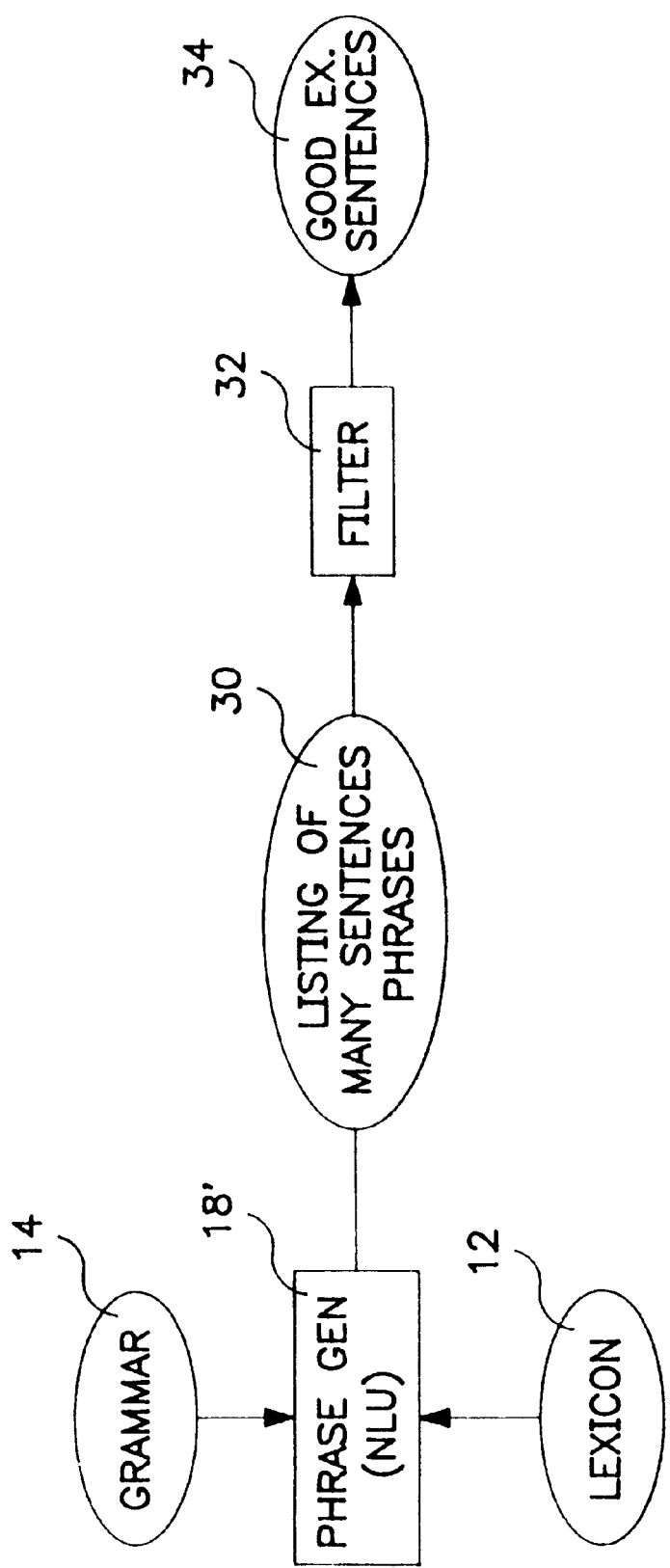
FIG. 2A is a functional block diagram/flow chart of the system that automatically generates sample questions.

FIG. 2A shows more detail of the phrase generating portion of the NLU 18', Grammar 14, and lexicon 12 when the system fails to respond to the user's input in a meaningful way. As described above the user may enter key words relevant to the information the user desires. The system responds by displaying a listing of many phrases/sentences 30 containing the keywords understood by the system for a particular application. The listing of phrases/sentences is filtered 32 to remove all phrases that do not retrieve any information. The result is a listing of examples 34 that the system will understand and retrieve information relevant thereto.

Figure 2B:
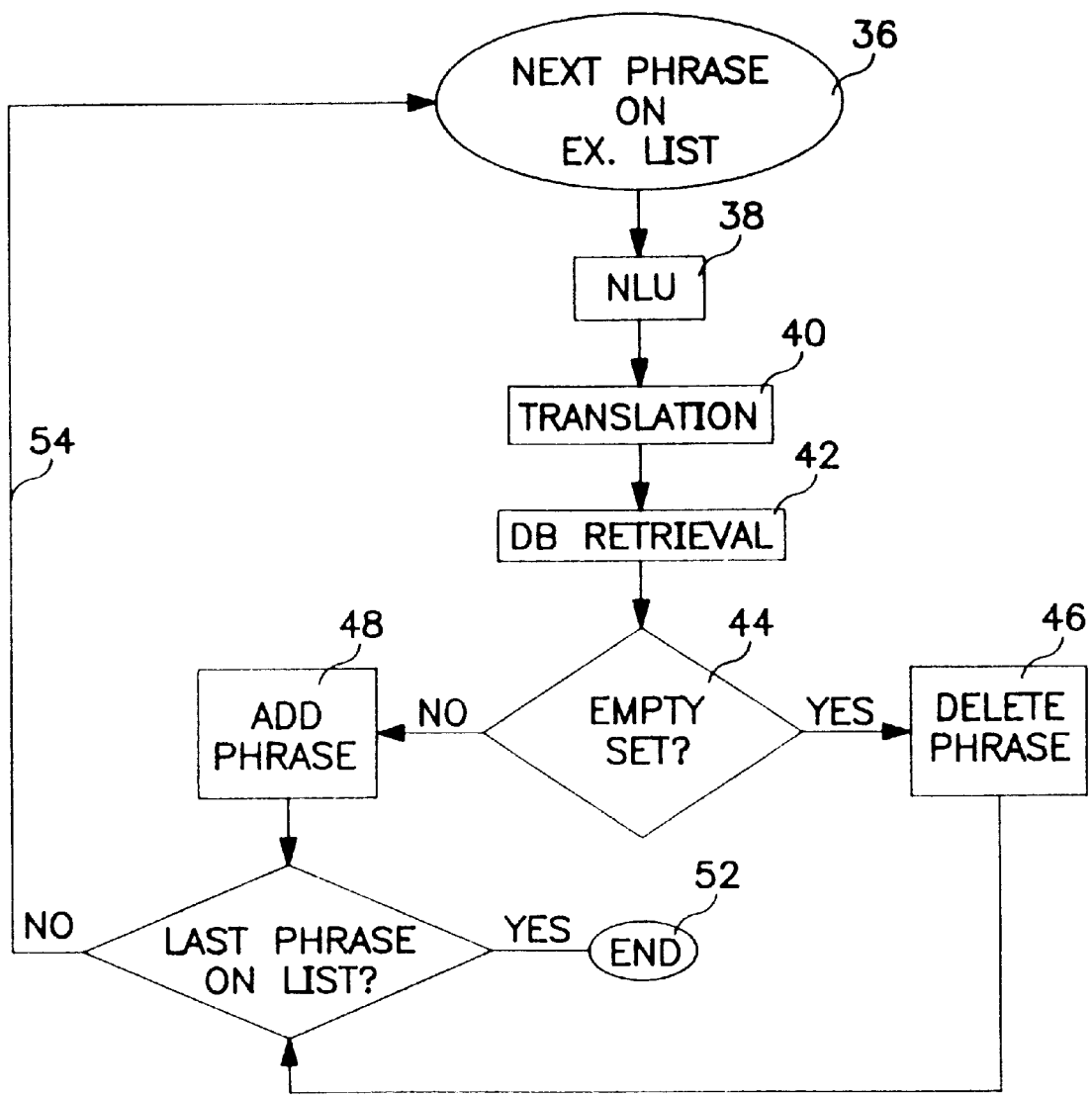
FIG. 2B is a functional block diagram/flow chart of the FILTER part of FIG. 2A.

The filter module 32 is shown in FIG. 2B. The purpose of this module is to drop from the list of possible phrases those phrases that will not retrieve any information when used as a queries to the system. Each possible phrase 36, which is a word string, is input to the NLU module which converts the phrase into a representation of the meaning. The meaning is translated 40 into a command form that is passed to the database retrieval program 42. If no result is retrieved 44, the phrase is deleted from the list 46, and conversely if a result is found the phrase remains on the list 48. If the phrase was the last one being analyzed 50 the list is complete and the process ends 52. If not the last phrase 54, the system analyzes the next phrase on the list.

Figure 3:
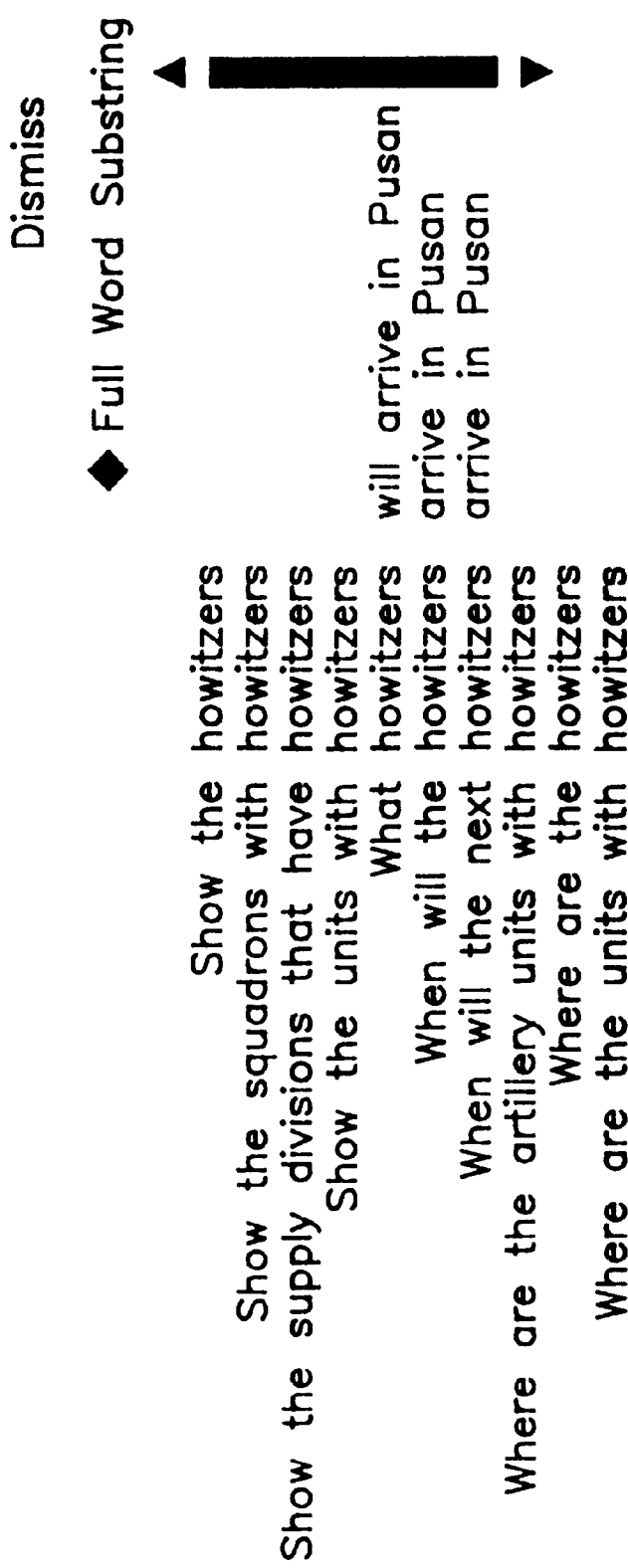
FIG. 3 is a chart showing illustrating the helping function of the present invention.

FIG. 3 is an example of typical responses to the key word "howitzers" input from a user. In this particular example, with a lexicon and grammar such as described in the addendums, the list of meaningful phrases, where meaning to the system refers to where the lexicon and grammar determine that the phrase is a proper construction. Notice the key word "howitzers" is a military term, and this preferred embodiment system is built around military meanings. Such a system produces the phrase shown. The phrases are presented to the user for the user's selection designating those phrases which are useful, if any. The user can generate additional questions and/or key words for searching through the database or database files from the phrases returned.

The user may add words to the lexicon which are incorporated with the grammar into new phrases.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method for retrieving data from files in a relational database, comprising the steps of:

receiving a query from a user, using the query to access the database, accepting key words from the user when a result of the database access is unacceptable, selecting sample phrases incorporating the key words, outputting the sample phrases for the user to review, receiving input from the user to select at least one of the sample phrases, and generating a database query based on the user input.

2. The method as defined in claim 1 wherein the step ot receiving a query from the user includes:

accepting speech inputs from said user.

3. The method as defined in claim 1 wherein the step of selecting sample phrases includes:

reviewing all phrases having the key words, selecting one or more of said phrases to form a group of phrases, determining a meaning for each of the phrases in the group, using the meanings as queries to the relational database, and identifying phrases of the group as the sample phrases based on results of the queries.

4. The method as defined in claim 3, further comprising the steps of:

inputting new key words, automatically generating new sample phrases using said new key words.

5. Apparatus for retrieving data from files in a relational database, comprising:

means for receiving a query from a user, means for using the query to access the database, means for accepting key words from the user when a result of the database access is unacceptable, means for selecting sample phrases incorporating the key words, means for outputting the sample phrases for the user to review, means for inputting new key words if no sample phrases exist, means for automatically generating new sample phrases containing said new key words, and means for generating a database query based on one of the sample phrases and the new sample phrases.

6. A computer-readable medium having stored thereon sequences of instructions which, when executed by a processing system, cause the processing system to perform the steps of:

receiving a query from a user, using the query to access the database, accepting key words from the user when a result of the database access is unacceptable, selecting sample phrases incorporating the key words, outputting the sample phrases for the user to review, receiving input from the user to select at least one of the sample phrases, and generating a database query based on the user input.

7. The computer-readable medium as defined in claim 6, wherein the selecting sample queries includes:

reviewing all phrases having the key words, selecting one or more of said phrases to form a group of phrases, determining a meaning for each of the phrases in the group, using the meanings as queries to the relational database, and identifying phrases of the group as the sample phrases based on results of the queries.

8. A computer system for retrieving data from files in a relational database comprising:

an input that accepts a spoken query from a user, a speech recognition module that converts the query into a natural language query, means for using the natural language query to access the database, means for accepting key words from the user when a result of the database access is unacceptable, means for selecting sample phrases incorporating the key words, means for receiving input from the user to select at least one of the sample phrases, and means for generating a database query based on the user input.

9. The system as defined in claim 8 further comprising:

means for formulating new queries based on the sample phrases, and means for inputting the new queries, means for attaching second meanings to the new queries, and means for generating a database query in accordance with said second meanings.

10. The system as defined in claim 8 wherein the means for selecting sample phrases includes:

means for reviewing all phrases having the key words, means for selecting a group of said phrases, attaching second meanings to said phrases in the group, and means for generating a database query in accordance with said second meanings.

\* \* \* \* \*